Oct. 29, 1929.  H. LEBESNEROIS  1,733,416
SEALING DEVICE FOR SHAFTS
Filed Aug. 9, 1926
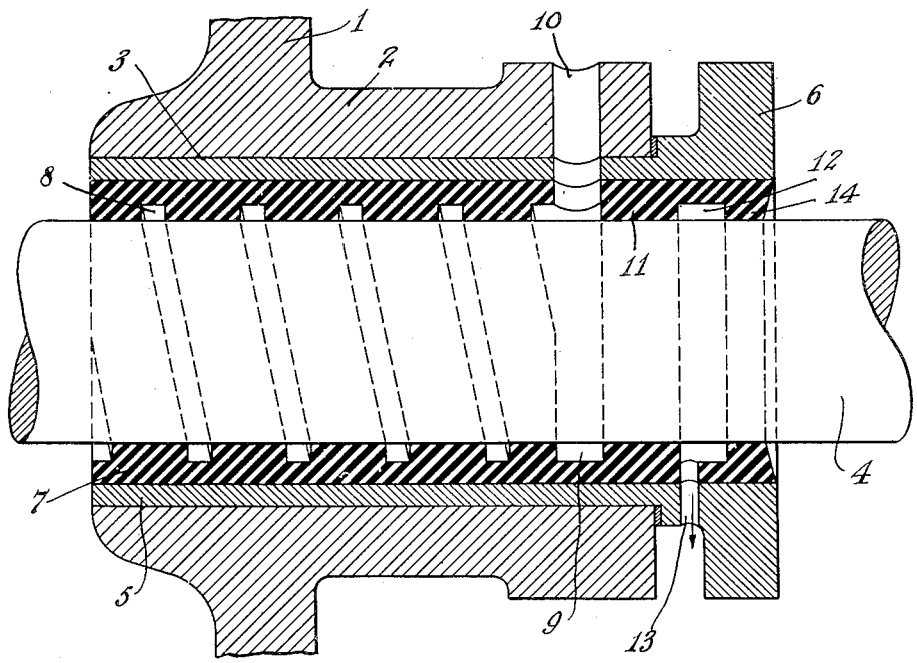

Patented Oct. 29, 1929

1,733,416

UNITED STATES PATENT OFFICE

HENRI LEBESNEROIS, OF VINCENNES, FRANCE, ASSIGNOR TO THE B. F. GOODRICH COMPANY, OF NEW YORK, N. Y., A CORPORATION OF NEW YORK

SEALING DEVICE FOR SHAFTS

Application filed August 9, 1926, Serial No. 128,173, and in Belgium August 13, 1925.

This invention relates to means for suitably sealing the opening in a wall occupied by a working shaft or rod, and more particularly the rotary shaft of an apparatus such as a centrifugal pump or hydraulic turbine. The invention further relates to combination bearing and sealing devices for shafts, especially such devices as are made of resilient rubber. Rubber has a high coefficient of friction when dry but a very low coefficient when wet, and if properly lubricated with water it can be used to great advantage as a bearing.

My principal object is to avoid the use of the common forms of packing held under tight compression in a stuffing box, which packings must be of an unctuous nature or have a lubricant incorporated therewith in order to avoid binding on the shaft. These commonly used packings require frequent adjustment and renewal, and they tend to cause wear upon the shaft which often necessitates the removal of the latter for repair or replacement, accompanied by serious expense not only for the actual labor and materials but also because of temporary loss of the use of the machine.

The accompanying drawing is a longitudinal sectional view showing a working shaft and adjacent parts including a combined bearing and sealing device embodying a preferred form of my invention.

In the drawing, 1 is the wall of the machine or apparatus of which the interior is at the left and the exterior at the right, said wall including a housing or journal box 2 having an opening 3 through which a working rod or shaft 4 projects. In the case of a centrifugal pump to which the invention especially (though not exclusively) applies, the rod 4 would be a rotary shaft carrying the runner or vaned wheel of said pump.

5 is a metallic sleeve or liner fitted in the opening of the housing 2 and formed at its outer end with a flange 6 by which it may be secured to the housing through suitable fastenings (not shown), and 7 is a bearing embracing the shaft 4, within the sleeve 5. Preferably, though not necessarily, this bearing is of a known type made of resilient rubber compound vulcanized to the inner surface of the metal sleeve 5, and in order to maintain a suitable lubricating liquid such as water, between the surfaces of the shaft and bearing, the inner surface of the latter is provided with a helical or spiral channel 8 for the circulation of said liquid. The particular form of the circulating channel or channels is not material, although it is preferred, in the case of a centrifugal pump, that the lubricating channel shall be open at its inner end to the interior of the pump, as shown, so that the water may discharge thereinto.

9 is an annular supply chamber surrounding the shaft 4 at the outer end of the bearing 7 and provided with a lateral inlet opening 10 extending through the housing 2 on the upper side of the latter through the sleeve 5 and the rubber, which inlet may connect through a suitable pipe with a source of water supply.

The outer wall of chamber 9 is formed by an annular resilient rubber sealing member 11, which conveniently may be in one piece with the bearing 7, although this is not essential. This member 11 is preferably of moderate, substantially uniform thickness in an axial direction, and receives water from all portions of the annular chamber 9 so that no portion thereof will run dry with consequent liability to overheating and abrasion of the rubber. The sealing member 11, like the bearing 7, embraces the shaft 4 with a slight clearance, and the pressure of water in the chamber 9 may be such as to cause the adjacent portion of the member 11 to hug the shaft and promote the sealing effect. The water supply in the chamber 9 which feeds the channel in the rubber bearing 7 also keeps the bearing surface of the sealing member 11 wet and reduces the coefficient of friction of said sealing member against the shaft.

Any small leakage of water escaping past the sealing member 11 is collected in an annular drainage chamber 12 having a lateral outlet 13 at its low point, extending through the rubber, the metal sleeve 5 and the housing 2, and the outer wall of this drainage chamber is formed by a second annular resilient rubber sealing member 14 embracing the shaft 4 with a slight clearance. This member 14 is also conveniently, though not necessarily, formed in one piece with the bearing 7 and the sealing member 11, and it receives sufficient water from the chamber 12 to insure its proper lubrication.

The entire arrangement is such that the rubber bearing 7 will be properly lubricated with water and the pump or turbine sealed against the entrance of air, while the shaft opening is sealed against the escape of any considerable amount of water yet without requiring the use of compression packing in the ordinary sense. The device when once properly fitted requires no adjustment or attention, and will render service for a long time without appreciable wear on the shaft and with a very small rate of wear of the rubber surfaces. It will be understood that the shaft 4 may be provided with one or more outside bearings of the ordinary type in order to sustain its weight and that of the turbine or pump runner.

It will further be understood that the details of embodiment may be considerably varied without departing from my invention.

I claim:

1. The combination of a shaft or rod, a bearing therefor adapted to operate without a stuffing-box, any annular chamber for supplying a lubricating liquid to one end of said bearing, and an annular, resilient member embracing the shaft for sealing said chamber.

2. Apparatus according to claim 1 adapted for use with water as the lubricating liquid and in which the resilient sealing member is composed of vulcanized rubber.

3. The combination of a working shaft, an annular, resilient, rubber sealing member embracing said shaft and fitted thereto without substantial pressure contact, means for supplying a lubricating liquid to one side of said member, and a drainage chamber on the opposite side of said member, provided with an outlet.

4. Apparatus according to claim 3 in which that wall of the drainage chamber opposite to the resilient, rubber sealing member is also composed of resilient rubber.

5. A shaft bearing and sealing device having bearing and sealing portions each composed of resilient rubber, means for supplying a lubricating water to said portions between the same, and means for collecting and carrying off the water which escapes past said sealing portion.

6. A resilient rubber bearing and sealing sleeve having a bearing portion formed on its inner surface with a water channel, a sealing portion spaced from said bearing portion by a water-receiving chamber, a lateral inlet to said chamber, a second sealing portion spaced from the first sealing portion by a water-collecting chamber, and a lateral outlet from said water-collecting chamber.

7. The combination of a shaft or rod and a water-lubricated bearing and sealing device therefor, the said device having a channeled internal rubber bearing surface and an internal, annular rubber sealing flange axially spaced apart from the bearing surface to provide an annular water-supply chamber, the said flange being so proportioned as to be caused to tighten upon the shaft in being flexed in an axial direction by the pressure of water in the said chamber.

8. A resilient rubber bearing and sealing sleeve for a water-lubricated shaft, the sleeve being integrally formed with an internal, channeled bearing surface and an internal annular flange adapted substantially to seal against the shaft and, between the said bearing surface and the said sealing flange, with an internal, annular channel for applying water to the bearing surface and the sealing flange.

In witness whereof I have hereunto set my hand this 21st day of July, 1926.

H. LEBESNEROIS.